(12) United States Patent
Lee et al.

(10) Patent No.: US 8,619,353 B2
(45) Date of Patent: Dec. 31, 2013

(54) ELECTRONIC PAPER DISPLAY APPARATUS AND METHOD THEREOF

(75) Inventors: Hwan-Soo Lee, Seoul (KR); Hye Yeon Cha, Gyeonggi-do (KR); Yongsoo Oh, Gyeonggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 109 days.

(21) Appl. No.: 13/373,293

(22) Filed: Nov. 10, 2011

(65) Prior Publication Data

US 2012/0147454 A1   Jun. 14, 2012

(30) Foreign Application Priority Data

Dec. 9, 2010  (KR) .......................... 10-2010-0125284

(51) Int. Cl.
*G02B 26/00* (2006.01)
*G09G 3/34* (2006.01)

(52) U.S. Cl.
USPC .......................................... 359/296; 345/107

(58) Field of Classification Search
CPC .......... G02B 26/007; G02F 1/172; G02F 1/23
USPC .................. 345/107, 108; 359/296
See application file for complete search history.

(56) References Cited

U.S. PATENT DOCUMENTS

| 5,900,858 | A | 5/1999 | Richley |
| 6,750,844 | B2 | 6/2004 | Nakanishi |
| 2008/0273132 | A1 | 11/2008 | Hsu et al. |
| 2010/0079440 | A1 | 4/2010 | Yamaguchi et al. |

FOREIGN PATENT DOCUMENTS

| JP | 2005-10796 | 1/2005 |
| JP | 2008-276153 | 11/2008 |
| JP | 2009-128766 | 6/2009 |
| JP | 2010-78902 | 4/2010 |
| JP | 2010-197649 | 9/2010 |

OTHER PUBLICATIONS

Japanese Office Action mailed Feb. 5, 2013 in corresponding Japanese Application No. 2011-243191 (Ref. AL in the IDS filed May 3, 2013).
Korean Office Action mailed Apr. 19, 2013 in corresponding Korean Application No. 10-2010-0125284 (Ref. AM in the IDS filed May 3, 2013).

*Primary Examiner* — David N Spector

(57) ABSTRACT

The present invention provides an electronic paper display apparatus, which comprises: plural pairs of rotating balls each pair having a first rotating ball and a second rotating ball of a size smaller than that of the first rotating ball; a partition wall member having a plurality of cavities each in which a respective rotating ball is positioned and configured to transversely separate the plurality of rotating balls from each other; an electrode structure formed on the partition wall member and configured to provide a drive voltage to each of the plurality of rotating balls; and a plurality of distance adjusting members disposed inside the plurality of cavities, with being faced the plurality of rotating balls.

17 Claims, 5 Drawing Sheets

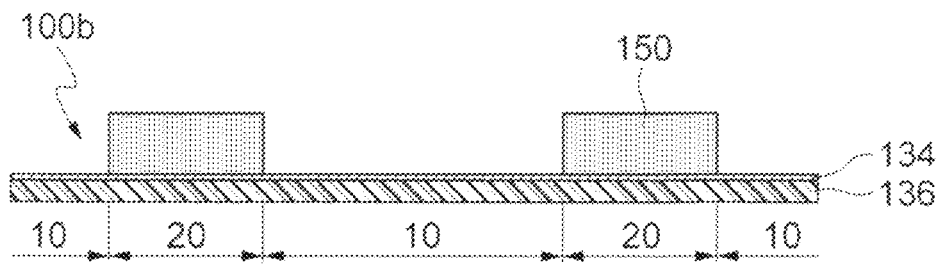
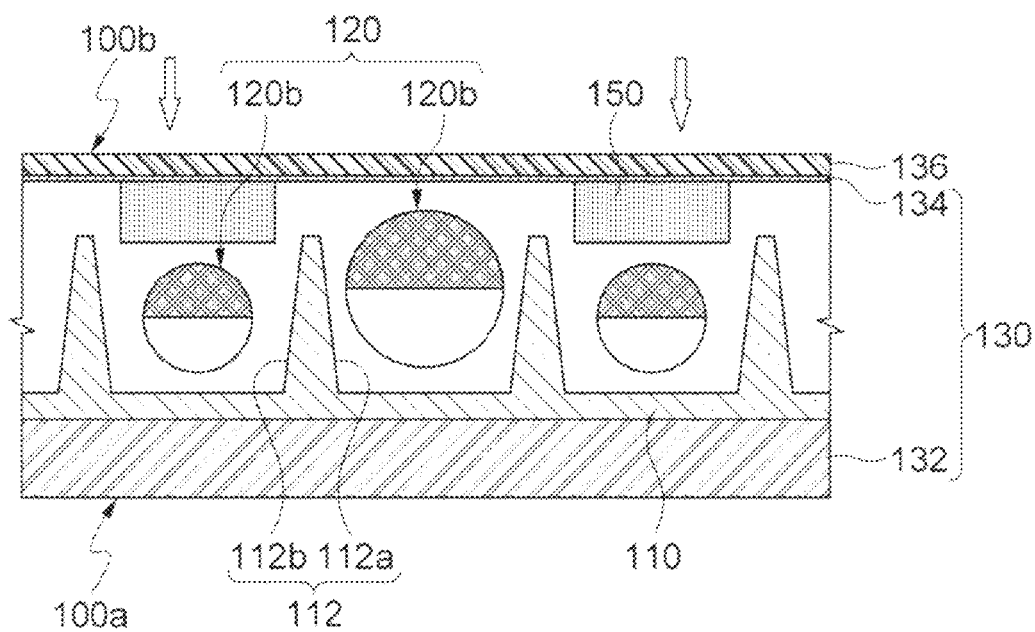

ELECTRONIC PAPER DISPLAY APPARATUS AND METHOD THEREOF

CROSS-REFERENCE TO RELATED APPLICATIONS

This application claims the benefit under 35 U.S.C. Section 119 of Korean Patent Application Serial No. 10-2010-0125284, entitled filed Dec. 9, 2010, which is hereby incorporated by reference in its entirety into this application.

BACKGROUND OF THE INVENTION

1. Field of the Invention

The present invention relates to an electronic paper display apparatus and a method thereof; and more particularly, to an electronic paper display apparatus and a method thereof in which the rotational property of rotating balls is improved.

2. Description of the Related Art

Among next-generation display apparatuses, an electronic paper display apparatus has been known have good availability and flexibility properties as against another display apparatuses, and operate at a low-power. As such, the electronic paper display apparatus may be substituted for a paper sheet printing medium such as a book form. Further, the electronic paper display apparatus may be most widely applicable to various types of display screen or electronic wallpaper.

Recently, one of the leading electronic paper display apparatuses is a twist ball type. of electronic paper display apparatus which uses plural pairs of rotating balls, each pair having two hemispheres of different colors. Such a twist ball type of electronic paper display apparatus includes the plurality of rotating balls, a partition wall member which separates the plurality of rotating balls from each other, an electrode structure which rotates the plurality of rotating balls, and a transparent insulating oil which provides a lubricating property to the plurality of rotating balls.

In the electronic paper display apparatus with a configuration as described above, the plurality of rotating balls are selectively operated to produce a color, which requires the rotating balls having a high rotational property. Factors that influence the property of the rotating balls may include an actual rotational property value of rotating balls, a type of insulating oil, a distance between partition wall members which transversely separate the rotating balls from each other, a distance between lower and upper structures which vertically house the rotating balls, or the like. Among these, distances between the rotating balls and each of the lower and upper structures may drastically influence the rotational property of the rotating balls. The reason for this is that the rotating balls vertically move during the rotation operation thereof. As such, when the distances between the rotating balls and each of the lower and upper structures falls outside a predetermined range, the rotational property of the rotating balls is drastically deteriorated.

In recent years, there is a technique which disposing plural pairs of rotating balls each pair having different sizes on the same plane. For example, in the each pair of rotating balls, one having a relatively larger size requires a relatively high level of drive voltage compared to the other. Using the difference in the drive voltages between the pair of rotating balls, the electrode structure adjusts the potential of the drive voltage on a step-by-step manner, thereby selectively rotating the rotating balls having different sizes, which in turn, controls the gradation of the electronic paper display apparatus on a step-by-step manner. Unfortunately, when the plural pairs of rotating balls each pair having different sizes are disposed on the same plane, the distances between the rotating balls and each of the lower and upper structures may be varied depending on the size of the rotating balls, which causes a non-uniform rotational property.

SUMMARY OF THE INVENTION

The present invention has been invented in order to overcome the above-described problems and it is, therefore, an object of the present invention to provide an electronic paper display apparatus in which the rotational property of rotating balls is improved.

Another object of the present invention is to provide an electronic paper display apparatus with a configuration in which plural pairs of rotating balls each pair of different sizes is disposed on the same plane and the rotational property of the rotating balls is uniformly maintained.

Yet another object of the present invention is to provide a method of manufacturing an electronic paper display apparatus in which the rotational property of rotating balls is improved.

Still yet another object of the present invention is to provide a method of manufacturing an electronic paper display apparatus with a configuration in which plural pairs of rotating balls each pair of different sizes are disposed on the same plane and the rotational property of the rotating balls is uniformly maintained.

In accordance with one aspect of the present invention to achieve the object, there is provided an electronic paper display apparatus, comprising: plural pairs of rotating balls each pair having a first rotating ball and a second rotating ball of a size smaller than that of the first rotating ball; a partition wall member having a plurality of cavities each in which a respective rotating ball is positioned and configured to transversely separate the plurality of rotating balls from each other; an electrode structure formed on the partition wall member and configured to provide a drive voltage to each of the plurality of rotating balls; and a plurality of distance adjusting members disposed inside the plurality of cavities, with being faced the plurality of rotating balls.

In accordance with the present invention, each of the plurality of distance adjusting members is selectively disposed inside a respective one of the plurality of cavities in which the second rotating ball is positioned.

In accordance with present invention, a thickness of the distance adjusting member is adjusted so that the ratio of the height of the cavity to the diameter of the rotating ball falls within the range of 1.1 to 1.7.

In accordance with the present invention, the electrode structure includes a lower electrode disposed beneath the partition wall member; and an upper electrode disposed above the partition wall member, wherein the distance adjusting member is coupled with at least one of the lower electrode and the upper electrode.

In accordance with the present invention, the distance adjusting member is an optically-transparent resist pattern.

In accordance with the present invention, the first rotating ball is driven by a drive voltage higher than that of the second rotating ball, wherein the electrode structure selectively provides a first drive voltage or a second drive voltage to the first or second rotating balls, wherein the first drive voltage is used in rotating both the first and second rotating balls, wherein the second drive voltage is used in rotating only the second rotating ball and has a potential lower than that of the first drive voltage.

Further, in accordance with another aspect of the present invention to achieve the object, there is provided an electronic paper display apparatus, which comprises plural pairs of rotating balls each pair having different diameters; a partition wall member having a plurality of cavities each in which a respective one of rotating balls is positioned; a lower structure formed beneath the partition wall member; an upper structure formed above the partition wall member, and configured to define the plurality of cavities together with the partition wall member and the lower structure; an electrode structure formed on the partition wall member and configured to provide drive voltages to each of the plurality of rotating balls; and a plurality of distance adjusting members disposed on at least one of the lower structure and the upper structure so that the ratio of the distance between the lower and upper structures to the diameter of the rotating ball falls within a predetermined range.

In accordance with the present invention, the predetermined range is 1.1 to 1.7.

In accordance with the present invention, the plurality of distance adjusting members is selectively disposed in one of the plurality of cavities, in which a relatively small size of rotating ball is positioned.

In accordance with the present invention, the plurality of distance adjusting members is an optically-transparent resist pattern disposed adjacent the lower structure compared to the rotating ball.

In accordance with the present invention, the plurality of distance adjusting members is disposed adjacent the lower structure compared to the rotating balls, wherein the distances between the rotating balls and the upper structure are equal to each other.

In accordance with the present invention, each of the plurality of distance adjusting members includes a first distance adjusting member disposed adjacent the lower structure compared to the rotating balls; and a second distance adjusting member disposed adjacent the upper structure compared to the rotating balls.

In accordance with the present invention, the distance adjusting member are a dry film resist (DFR).

In accordance with the present invention, the first rotating ball is driven by a drive voltage higher than that of the second rotating ball, wherein the electrode structure selectively provides a first drive voltage or a second drive voltage to the first or second rotating balls, wherein the first drive voltage is used in rotating both the first and second rotating balls, wherein the second drive voltage is used in rotating only the second rotating ball and has a potential lower than that of the first drive voltage.

Further, in accordance with still another aspect of the present invention to achieve the object, there is provided a method of manufacturing an electronic paper display apparatus, which comprises preparing plural pairs of rotating balls each pair having a first rotating ball and a second rotating ball of a size smaller than that of the first rotating ball; forming a partition wall member having a plurality of cavities each in which a respective one of rotating balls is positioned, on a lower electrode, and further forming a lower structure; forming an upper structure with an upper electrode which provides a drive voltage to each of the plurality of rotating balls; forming a plurality of distance adjusting members on at least one of the lower structure and the upper structure; and disposing the distance adjusting member inside the plurality of cavities and further coupling the lower structure and the upper structure so that the ratio of the distance between the lower and upper structures to the diameter of the rotating balls falls within a predetermined range.

In accordance with the present invention, the forming the distance adjusting members includes forming an insulating film on the upper structure, wherein the thickness of the insulating film is adjusted so that the ratio of the height between the lower and upper structures to the diameter of the rotating balls falls within the range of 1.1 to 1.7.

In accordance with the present invention, the forming the distance adjusting members includes forming a dry film resist on at least one of the lower and upper electrodes; and removing the dry film resist film formed on the remaining region excluding one facing the second rotating ball in the upper electrode.

In accordance with the present invention, the forming the dry film resist includes laminating an optically-transparent dry film resist on the upper structure.

In accordance with the present invention, the coupling includes forming a spacer on the lower structure and the upper structure; and closely attaching the lower structure and the upper structure using the spacer as a stop film.

In accordance with the electronic paper display apparatus of the present invention, it is possible to adjust the ratio of the distance between the lower and upper structures to the diameters of the rotating balls each of different sizes at a predetermined range, thereby improves the rotational property of the rotating balls.

Further, in accordance with the method of the present invention, it is possible to adjust the ratio of the distance between the lower and upper structures to the diameters of the rotating balls each of different sizes at a predetermined range, thereby improves the rotational property of the rotating balls.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 4 to FIG. 7 are a sectional view explaining a method of manufacturing an electronic paper display apparatus in accordance with another embodiment of the present invention, respectively;

DETAILED DESCRIPTION OF THE PREFERABLE EMBODIMENTS

Hereinafter, specific embodiments of the present invention will be described with reference to the accompanying drawings. However, the following embodiments are provided as examples but are not intended to limit the present invention thereto.

Descriptions of well-known components and processing techniques are omitted so as not to unnecessarily obscure the embodiments of the present invention. The following terms are defined in consideration of functions of the present invention and may be changed according to users or operator's intentions or customs. Thus, the terms shall be defined based on the contents described throughout the specification.

The technical sprit of the present invention should be defined by the appended claims, and the following embodiments are merely examples for efficiently describing the technical spirit of the present invention to those skilled in the art.

Figure 1:
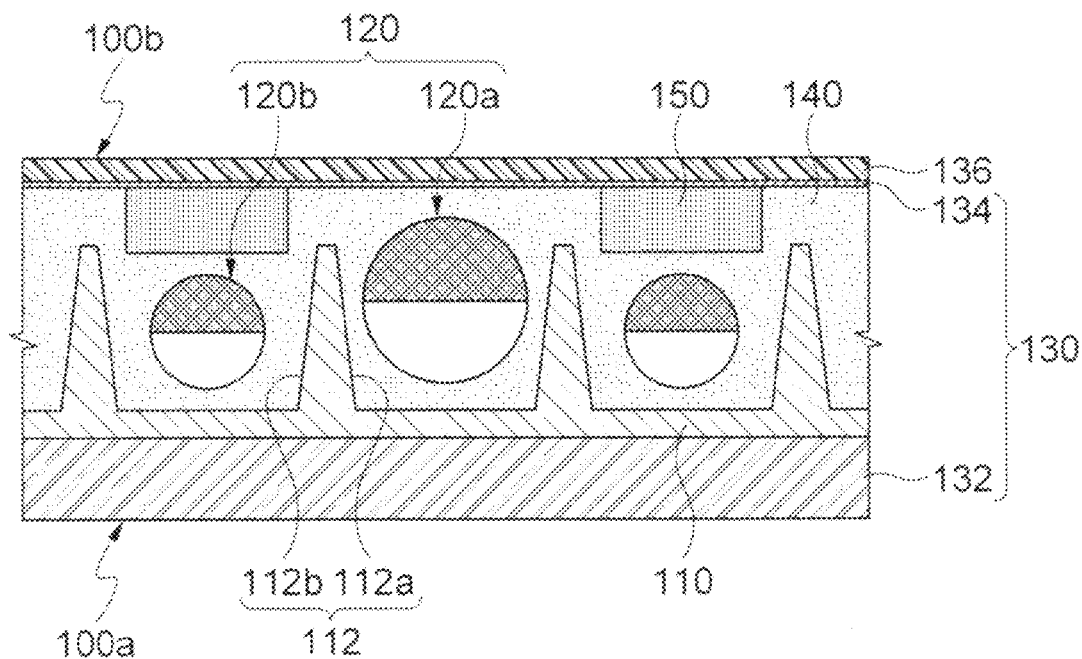
FIG. 1 is a sectional view of an electronic paper display apparatus according to illustrative embodiment of the present invention.
Figure 2:
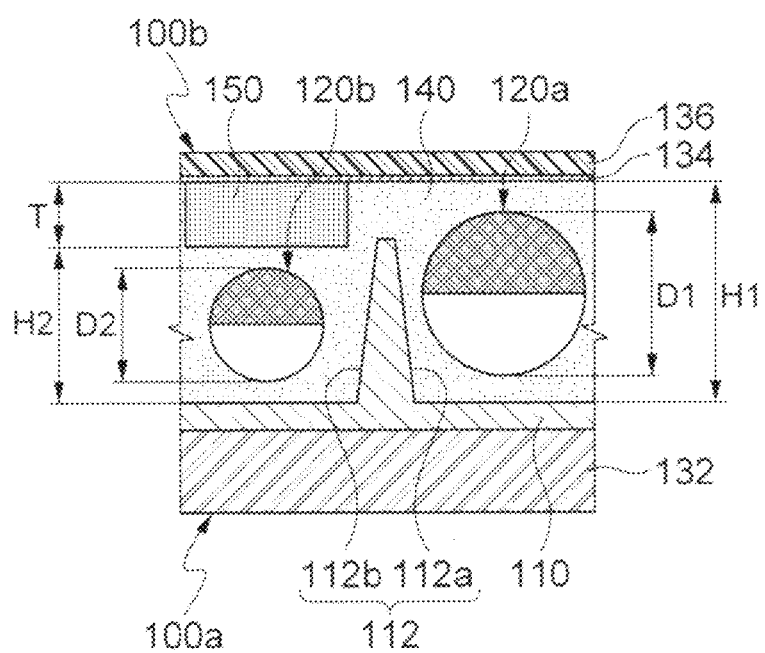
FIG. 2 is a detailed sectional view of a distance adjusting member shown in FIG. 1.

FIG. 1 is a sectional view of an electronic paper display apparatus according to illustrative embodiment of the present invention. FIG. 2 is a detailed sectional view of a distance adjusting member shown in FIG. 1.

Referring to FIGS. 1 and 2, an electronic paper display apparatus 100 according to illustrative embodiment of the present invention includes a lower structure 100a and an upper structure 100b. The lower structure 100a includes a partition wall member 110 and a lower electrode 132. The upper structure 100b includes an upper electrode 134 and a distance adjusting member 150. The lower structure 100a and the upper structure 100b define a plurality of cavities 112 each housing a respective one of plural pairs of rotating ball 120 therein. Each of the plurality of cavities 112, which has a nearly cylindrical shape, includes its inside filled with an insulating oil 140. In the electronic paper display apparatus 100 with a configuration as described above, the plurality of rotating balls 120 are transversely separated by the partition wall member 110 and are vertically held by the lower structure 100a and the upper structure 100b.

The partition wall member 110 supports and separates the plurality of rotating balls 120. The partition wall member 110 includes a plurality of recesses each defining the plurality of cavities 112. The plurality of cavities 112 provide respectively a space in which the plurality of rotating balls 120 are disposed in the partition wall member 110. The plurality of cavities 112 are filled with the insulating oil 140. This allows the plurality of rotating balls 120 to smoothly rotate. The insulating oil 140 may be made of an optically-transparent material.

Each of the plural pairs of rotating balls 120 has different sizes. For example, each of the plural pairs of rotating balls 120 includes a first rotating ball 120a and a second rotating ball 120b having a size smaller than that of the first rotating ball 120a. The first rotating ball 120a, which has a relatively large size compared to the second rotating ball 120b, requires a relatively high potential of drive voltage compared to the first rotating ball 120b. Specifically, the plurality of rotating balls 120 is rotated by a drive voltage provided from an electrode structure 130. The second rotating ball 120b, which has a relatively small size compared to the first rotating ball 120a, is rotated by a relatively low potential of drive voltage compared to the first rotating ball 120a. As such, the electrode structure 130 adjusts the potential of the drive voltage in a step-by-step manner to selectively rotate at least one of the first rotating ball 120a and the second rotating ball 120b. In this way, the electronic paper display apparatus 100 adjusts the gradation of the electronic paper display apparatus 100 to be displaced externally in a step-by-step manner.

Each of the first and second rotating balls 120a and 120b has a spherical shape formed by two hemispheres. For example, first and second hemispheres making up each pair of rotating balls 120 have different colors. When the electronic paper display apparatus 100 is configured in a monochrome type, the first hemisphere may develop a white color, and the second hemisphere may develop a black color. Alternatively, when the electronic paper display apparatus 100 is configured in a color type, the first hemisphere may develop any one of a red, green, blue, cyan, magenta, yellow, white and black, and the second hemisphere may develop another one of a red, green, blue, cyan, magenta, yellow, white and black. Further, the first and second hemispheres may be electrified into different charges. Alternatively, only one of the first and second hemispheres may be electrified.

The electrode structure 130 includes the lower electrode 132 and the upper electrode 134. The lower electrode 132 is disposed beneath the partition wall member 110 and the upper electrode 134 is disposed above the partition wall member 110. The lower electrode 132 and the upper electrode 134 selectively provide a predetermined drive voltage to the plurality of rotating balls 120, thereby rotating them. As a result, one of the first and second hemispheres that produces a designated color, is directed outside (upward in FIG. 1). The lower electrode 132 may be used as a base substrate for mounting components of the electronic paper display apparatus 100.

While in the above embodiment, the lower electrode 132 and the upper electrode 134 have been explained to be formed in a flat plate shape, in other embodiments they may be formed in various shapes to independently drive each of the plurality of rotating balls 120. For example, at least one of the lower electrode 132 and the upper electrode 134 may be formed in a flat plate shape and the other may by formed as a line which faces each of the plurality of rotating balls 120. In this case, each of the plurality of rotating balls 120 may be independently rotated by the electrode structure 130.

The upper structure 100b further includes a transparent substrate 136. The transparent substrate 136 may be a glass substrate which is formed on the upper electrode 134. Further, the transparent substrate 136 may expose outside. A reinforced glass may be preferably employed as the transparent substrate 136.

The distance adjusting member 150 adjusts the ratio of the diameter of the rotating ball 120 to distances between the rotating ball 120 and each of the lower and upper structures 100a and 100b. Specifically, the rotational property of each rotating ball 120 may be changed by the distance between the lower structure 100a and the upper structure 100b, which interposes each of the plurality of rotating balls 120 therebetween. Recently, in a twist ball type of electronic paper display apparatus, there is known that a bobbing motion is generated in twist balls (i.e., the rotating ball 120) in addition to the rolling motion as described above. Accordingly, in view of the foregoing, there is needed to adjust the distance (which defines the height of the cavities 112) between the lower structure 100a and the upper structure 100b to a predetermined distance, with respect to the diameter of the rotating ball 120. This achieves an uniform rotational property of the rotating ball 120. However, when the sizes of the plurality of rotating balls 120 disposed on the same plane are different, the distances between the rotating ball 120 and each of the lower and upper structures 100a and 100b may be varied for each rotating ball. As such, the distance adjusting member 150 is provided to avoid increasing the distances between the between the rotating ball 120 and each of the lower and upper structures 100a and 100b, in a region where a rotating ball of a relatively small size is positioned.

For example, it has been found that, when the ratio of the distance (or height) between the lower structure 100a and the upper structure 100b to the diameter of the rotating ball falls within the range of 1.1 to 1.7, the rotating property of the rotating ball is better. When the ratio of the distance to the diameter of the rotating ball is less than 1.1, a rotational resistance of the second rotating ball 120b is excessively increased, which prevents the second rotating ball 120b from being smoothly rotated. This drastically deteriorates the rotational property of the second rotating ball 120b. Meanwhile, when the ratio of the distance to the diameter of the rotating ball is higher than 1.7, the rotational resistance of the second rotating ball 120b is excessively decreased, which elevates a flow property of the second rotating ball 120b. This also drastically deteriorates the rotational property of the second rotating ball 120b.

For this reason, the distance adjusting member 150 is not disposed within a first cavity 112a in a region where a rotating ball 120a of a relatively large size is positioned, so that the ratio of the height HI between the lower structure 100a and the upper structure 100b to the diameter D1 of the first rotating ball 120a is set to fall within the range of 1.1 to 1.7. Meanwhile, the distance adjusting member 150 is disposed within a second cavity 112b in a region where a second rotating ball 120b of a relatively small size is positioned, so that the ratio of the height H2 between the lower structure 100a and the upper structure 100b to the diameter D2 of the second rotating ball 120b is set to fall within the range of 1.1 to 1.7. That is to say, the height H2 between the upper structure 100b and the lower structure 100a in the second cavity 112b corresponds substantially to a value that is obtained by subtracting a thickness T of the distance adjusting member 150 from the height HI of the first cavity 112a. Thus, the thickness of the distance adjusting member 150 is adjusted in consideration of the diameter D2 of the second rotating ball 120b, so that the height H2 where the second cavity 112b is positioned meets the condition of 1.1 to 1.7 with respect to the diameter D2 of the second rotating ball 120b. Accordingly, in the electronic paper display apparatus 100 with the configuration as described above, it is possible to obtain a structure in which the plurality of rotating balls 120 of different sizes are disposed on the same plane, and the distances between the rotating ball 120 and each of the lower and upper structures 100a and 100b meets the predetermined range.

Further, since the distance adjusting member 150 may be disposed adjacent to the upper electrode 134 compared to the rotating ball 120, the second rotating ball 120b develops a designated color via the distance adjusting member 150. For this reason, the distance adjusting member 150 may be preferably made of an optically-transparent material. For example, the distance adjusting member 150 may include a dry film resist (DFR).

As described above, the electronic paper display apparatus 100 according to the present invention includes the partition wall member 110 configured to transversely separate the plurality of rotating balls 120 from each other, the upper and lower structures 100b and 100a configured to vertically house the plurality of rotating balls 120, and the distance adjusting member 150 configured to adjust the ratio of the height between the lower and upper structures 100a and 100b to the diameter of the plurality of rotating balls 120 each of different sizes to meet the predetermined condition. As a result, in accordance with the electronic paper display apparatus 100, it is possible to adjust the ratio of the height between the lower and upper structures to the diameters of the plurality of rotating balls each of different sizes within the predetermined range, which improves the rotational property of the rotating balls.

In the following, a description will be made as to a method of manufacturing the electronic paper display apparatus according to the present invention. Same reference numerals will be used to describe the elements that are shared with the above-described embodiment. Detailed descriptions for the above-described shared elements will be omitted.

Figure 3:
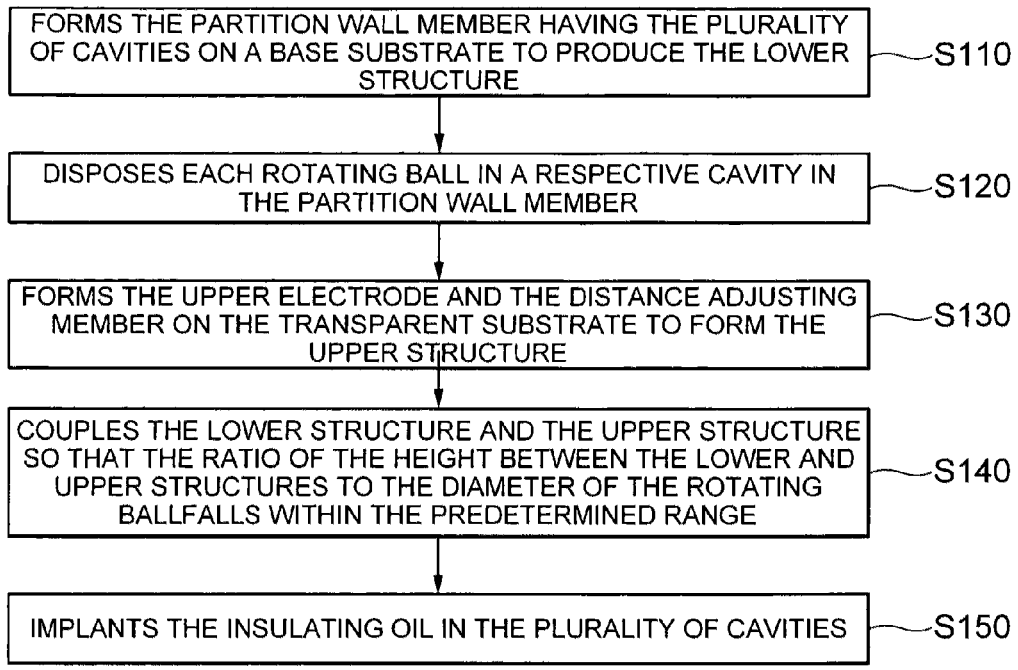
FIG. 3 is a flow chart explaining a method of manufacturing an electronic paper display apparatus in accordance with another embodiment of the present invention.
Figure 4:
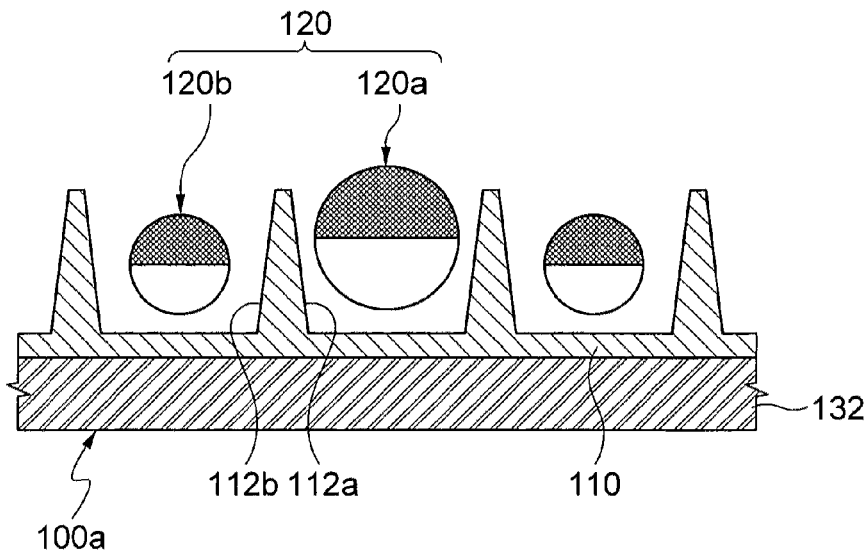

As shown in FIGS. 3 and 4, initially, the partition wall member 110 having the plurality of cavities 112 is formed on a base substrate to produce the lower structure 100a (S110). For example, the base substrate is prepared. The base substrate may be a support plate for forming respective components (e.g., the lower structure 100a) of the electronic paper display apparatus. For example, the base substrate may be a plate-shaped electrode for applying a drive voltage to each of the plurality of rotating balls. For example, preparing the base substrate may include preparing the lower electrode 132. The preparing the lower electrode 132 may include preparing a conductive metal plate. The metal plate may by a conductive plate made of a copper (Cu).

Subsequently, the partition wall member 110 is formed on the lower electrode 132. Forming the partition wall member 110 may include forming a partition wall formation film on the lower electrode 132, and forming the plurality of cavities 112 on the partition wall formation film. The forming the partition wall formation film is performed by forming an insulating film which covers the whole surface of the lower electrode 132 with a uniform thickness. The insulating film may be, for example, a photoactive insulating material such as a dry film resist (DFR). When the partition wall formation film is made of the dry film resist, the forming the partition wall formation film is performed by laminating the dry film resist on the whole surface of the lower electrode 132. Further, the forming the plurality of cavities 112 is performed by a photolithograph process of selectively removing a region where the plurality of cavities 112 are formed.

Subsequently, each of the plurality of rotating balls 120 is disposed in respective one of the plurality of cavities 112 in the partition wall member 110 (S120). The disposing the plurality of rotating balls 120 includes preparing the first rotating ball 120a and the second rotating ball 120b having a diameter smaller than that of the first rotating ball 120a, and positioning the first rotating ball 120a in the first cavity 112a of the plurality of cavities 112, and positioning the second rotating ball 120b in the second cavity 112b of the plurality of cavities 112. Thus, the first and second rotating ball 120a and 120b, which are located on the same plane and are transversely separated from each other by the partition wall member 110, are disposed on the lower structure 100a.

While in the above embodiment, the respective components of the electronic paper display apparatus have been explained to be subsequently formed on the lower electrode 132 by using the lower electrode 132 as the base substrate, but not limited thereto. For example, in an alternative embodiment, the respective components of the electronic paper display apparatus may be subsequently formed on another base substrate (not shown) which is further prepared. In this case, the lower electrode 132 may be formed on the another base substrate.

Subsequently, as shown in FIGS. 3 and 5, the upper electrode 134 and the distance adjusting member 150 are formed on the transparent substrate 136 to form the upper structure 100b (S130). For example, the transparent substrate 136 is initially prepared. The transparent substrate 136 may be made by a material with a high optically-transparent. Subsequently, the upper electrode 134 is formed on the transparent substrate 136. The forming the upper electrode 134 is performed by forming an optically-transparent conductive film on the transparent substrate 136. For example, the forming the upper electrode 134 may be performed by uniformly coating an Indium Tin Oxide (ITO) on the whole surface of the transparent substrate 136.

The forming the distance adjusting member 150 includes forming a predetermined insulating pattern on the upper electrode 134. For example, the forming the distance adjusting member 150 may include preparing a dry film resist, laminating the dry film resist on the upper electrode 134, and patterning the dry film resist by a photolithograph process. The dry film resist may be preferably made of a high optically-transparent material. The patterning the dry film resist may include removing the dry film resist, which is formed on the remaining region excluding one facing the second rotating ball 120b in the upper electrode 134. Thus, a resist pattern, which selectively exposes the remaining region, is formed on the upper electrode 134.

Further, the forming the distance adjusting member 150 may include adjusting the thickness of the resist pattern to a predetermined thickness. For example, as shown in FIGS. 1 and 2, the dry film resist having the predetermined thickness may be laminated on the upper electrode 134 so that the ratio of the height H2 between the lower and upper structures 100b and 100a to the diameter D2 of the second rotating ball 120b (shown in FIG. 4) falls within the range of 1.1 to 1.7.

Subsequently, as shown in FIGS. 3 and 6, the lower structure 100a and the upper structure 100b are coupled so that the ratio of the height between the lower and upper structures 100b and 100a to the diameter of the rotating ball 120 falls within the predetermined range (S140). For example, the coupling the lower structure 100a and the upper structure 100b may include aligning the upper structure 100b on the lower structure 100a such that the distance adjusting member 150 faces the second cavity 112b inside the partition wall member 110, and closely attaching the lower structure 100a and the upper structure 100b such that the distance between the lower structure 100a and the upper structure 100b meets a predetermined distance. In the closely attaching the lower structure 100a and the upper structure 100b, the lower structure 100a and the upper structure 100b should be fixed at a predetermined location. To do this, a spacer (not shown) as a stopper may be disposed between the lower structure 100a and the upper structure 100b.

Figure 7:
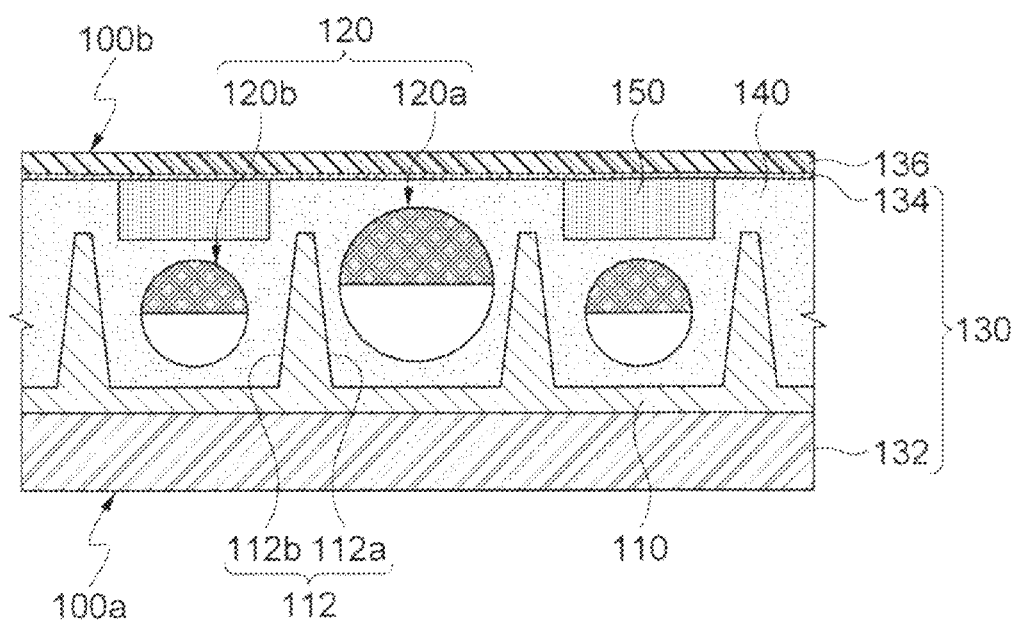

Subsequently, as shown in FIGS. 3 and 7, the insulating oil 140 is implanted in the plurality of cavities 112 (S150). For example, the implanting the insulating oil 140 may be performed by implanting the insulating oil 140 in the plurality of cavities 112 through the gap between the lower structure 100a and the upper structure 100b.

As described above, the manufacturing method of the electronic paper display apparatus according to the present invention includes forming the lower structure 100a having the partition wall member 110 which transversely separates the plurality of rotating balls 120 of different sizes, forming the upper structure 100b which vertically house the plurality of rotating balls 120 together with the lower structure 100a, and coupling the lower structure 100a and the upper structure 100b. The forming the upper structure 100b may further include forming the distance adjusting member 150 which faces the second rotating ball 120b of a relatively small size. The distance adjusting member 150 allows the ratio of the height between the lower and upper structures 100b and 100a to the diameter of the second rotating ball 120b to fall within the predetermined range. Therefore, in accordance with the present invention, it is possible to adjusting the ratio of the height between the lower and upper structures to the diameters of the rotating balls of different sizes at the predetermined range, thereby improves the rotational property of the rotating balls.

In the following, a description will be made as to an electronic paper display apparatus according to another alternative embodiment. Same reference numeral& will be used to describe the elements that are shared with the above-described embodiment. Detailed descriptions for the above-described shared elements will be omitted.

Figure 8:
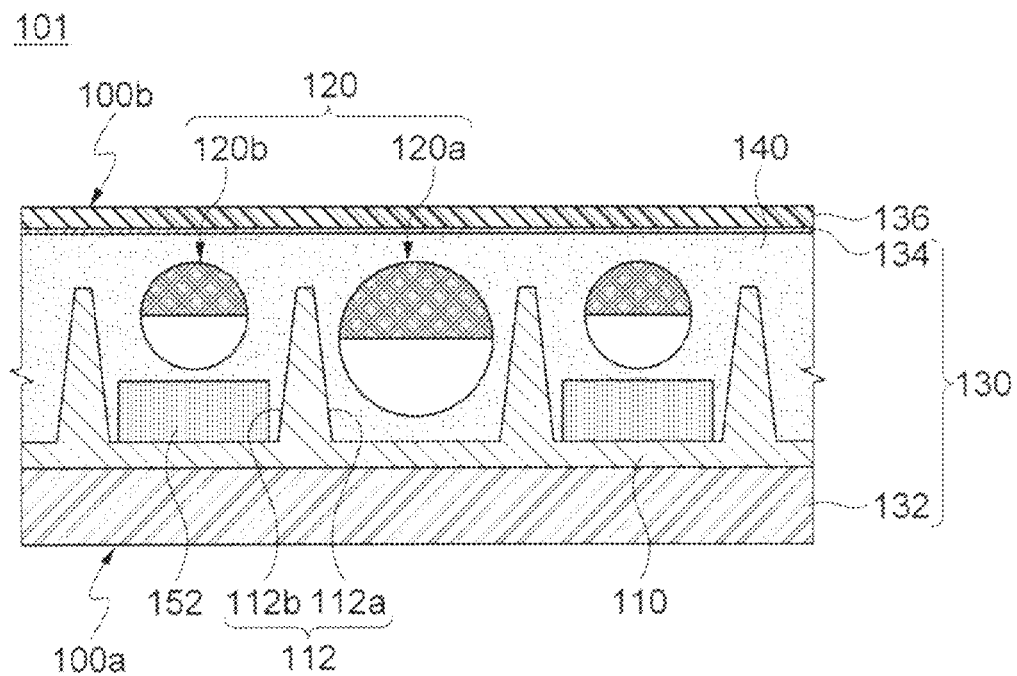
FIG. 8 is a sectional view of an electronic paper display apparatus according to another alternative embodiment.

FIG. 8 is a sectional view of the electronic paper display apparatus according to another alternative embodiment. As shown in FIG. 8, an electronic paper display apparatus 101 according to another alternative embodiment includes a configuration in which a distance adjusting member 152 is formed on the lower structure 100a, unlike the electronic paper display apparatus 100 as shown in FIG. 1. Specifically, the electronic paper display apparatus 101 includes the plurality of rotating balls 120 configured by the first and second rotating balls 120a and 120b each of different sizes, and the lower and upper structures 100a and 100b which vertically house the plurality of rotating balls 120, with being oppositely each other. The lower structure 100a includes the lower electrode 132, the partition wall member 110 configured to transversely separate the plurality of rotating balls 120 from each other and including the plurality of cavities 112 in which the plurality of rotating balls 120 are positioned, and the distance adjusting member 152 disposed inside the second cavity 112b of the plurality of cavities 112. The upper structure 100b includes the upper electrode 134 and the transparent substrate 136.

The distance adjusting member 152 may be adjusted such that the ratio of the height between the lower and upper structures 100b and 100a to the diameters of the rotating balls 120 of different sizes falls within the predetermined range. Further, the distance adjusting member 152 is disposed inside the second cavity 112b in which the second rotating ball 120b of a relatively small size, so that the ratio of the height between the lower and upper structures to the diameter of the rotating ball 120 falls within at the predetermined range. By doing so, it is possible to adjust the height of the second rotating ball 120b.

As described above, the electronic paper display apparatus electronic paper display apparatus 101 according to the another alternative embodiment includes the distance adjusting member 152 so that the ratio of the height between the lower and upper structures 100b and 100a to the diameter of the rotating ball 120 is adjusted within the predetermined range and the distance between the lower structure 100a and the upper structure 100b is maintained at a constant value. Therefore, in accordance with the another alternative embodiment as described above, it is possible to adjust the ratio of the height between the lower and upper structures to the diameters of the first and second rotating balls 120a and 120b of different sizes at the predetermined range, and maintain the distance between the lower structure 100a and the upper structure 100b at a constant value.

Figure 9:
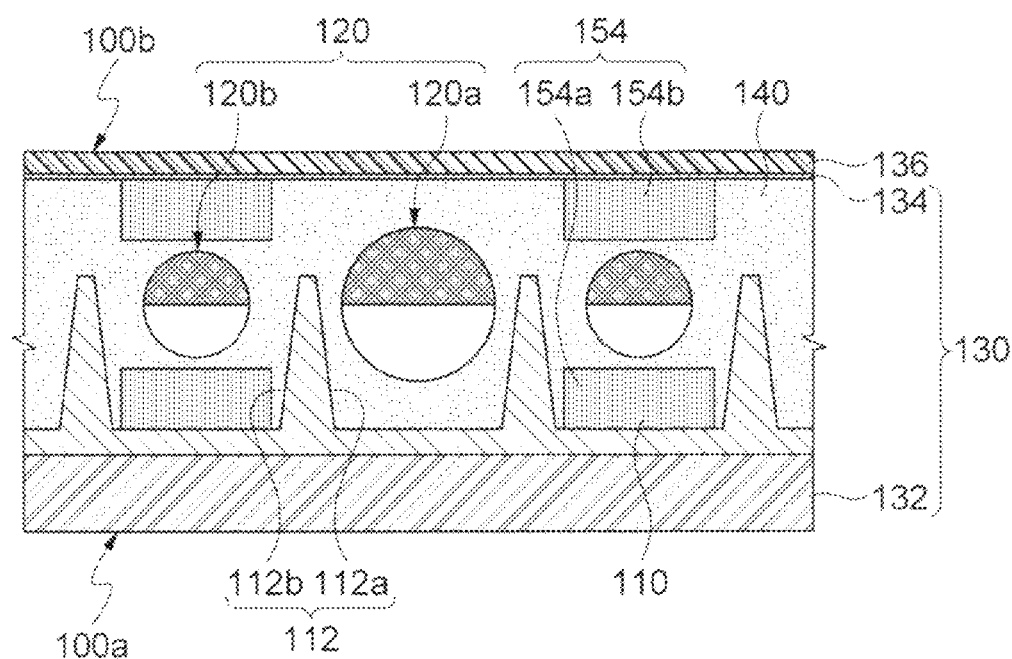
FIG. 9 is a sectional view of an electronic paper display apparatus according to still another alternative embodiment.

FIG. 9 is a sectional view of an electronic paper display apparatus according to still another alternative embodiment. As shown in FIG. 8, an electronic paper display apparatus 102 according to still another alternative embodiment includes a configuration in which a distance adjusting member 154 is formed on both the lower structure 100a and the upper structure 100b, unlike the electronic paper display apparatus 100 as shown in FIG. 1. Specifically, the electronic paper display apparatus 102 includes the plurality of rotating balls 120 configured by the first and second rotating balls 120a and 120b each of different sizes, and the lower and upper structures 100a and 100b which vertically house the plurality of rotating balls 120, with being oppositely each other. The lower structure 100a includes the lower electrode 132, the partition wall member 110 configured to transversely separate the plurality of rotating balls 120 from each other and including the plurality of cavities 112 in which the plurality of rotating balls 120 are positioned, and the distance adjusting member 154a disposed inside the second cavity 112b of the plurality of cavities 112. The upper structure 100b includes the upper electrode 134, the transparent substrate 136, and a distance adjusting member 154b which vertically houses the plurality of rotating balls 120 together with the distance adjusting member 154a.

The distance adjusting member 154a and 154b may be adjusted such that the ratio of the height between the lower and upper structures 100b and 100a to the diameters of the rotating balls 120 of different sizes falls within the predetermined range. Further, the distance adjusting members 154a and 154b are disposed inside the second cavity 112b in which the second rotating ball 120b of a relatively small size, so, that the distances between the plurality of rotating balls 120 and the upper structure 100b are equal to each other. The distance adjusting member 154a is disposed inside the second cavity 112b in the partition wall member 110, thereby adjusting the distance between the second rotating ball 120b and the upper structure 100b. Further, the distance adjusting member 154b is formed on the upper electrode 134 facing the second cavity 112b, thereby adjusting the distance between the second rotating ball 120b and the upper structure 100b.

The electronic paper display apparatus 102 with the configuration as described above includes the distance adjusting member 154 so that the ratio of the height between the lower and upper structures 100b and 100a to the diameters of the first and second rotating balls 120a and 120b of different sizes falls within the predetermined range. The distance adjusting member 154 includes the distance adjusting member 154a disposed on the lower structure 100a and the distance adjusting member 154b disposed on the upper structure 100b. In accordance with the electronic paper display apparatus 102 according to the still another alternative embodiment, it is possible to adjust the thickness of the distance adjusting member 154a and 154b, which in turn, adjusts the ratio of the height between the lower and upper structures 100b and 100a to the diameter of the rotating ball 120 at the predetermined range.

While the invention has been described in detail with reference to preferred embodiments thereof, it will be appreciated by those skilled in the art that changes may be made in these embodiments without departing from the scope of the invention.

Thus, the scope of the invention should be determined by the appended claims and their equivalents, rather than by the described embodiments.

What is claimed is:

1. An electronic paper display apparatus, comprising:
   plural pairs of rotating balls each pair having a first rotating ball and a second rotating ball of a size smaller than that of the first rotating ball;
   a partition wall member having a plurality of cavities each in which a respective rotating ball is positioned and configured to transversely separate the plurality of rotating balls from each other;
   an electrode structure formed on the partition wall member and configured to provide a drive voltage to each of the plurality of rotating balls; and
   a plurality of distance adjusting members disposed inside the plurality of cavities, with being faced the plurality of rotating balls,
   wherein a thickness of the distance adjusting member is adjusted so that the ratio of the height of the cavity to the diameter of the rotating ball falls within the range of 1.1 to 1.7.

2. The apparatus according to claim 1, wherein each of the plurality of distance adjusting members is selectively disposed inside a respective one of the plurality of cavities in which the second rotating ball is positioned.

3. The apparatus according to claim 1, wherein the electrode structure includes:
   a lower electrode disposed beneath the partition wall member; and
   an upper electrode disposed above the partition wall member,
   wherein the distance adjusting member is coupled with at least one of the lower electrode and the upper electrode.

4. The apparatus according to claim 1, wherein the distance adjusting member is an optically-transparent resist pattern.

5. The apparatus according to claim 1, wherein the first rotating ball is driven by a drive voltage higher than that of the second rotating ball,
   wherein the electrode structure selectively provides a first drive voltage or a second drive voltage to the first or second rotating balls, wherein the first drive voltage is used in rotating both the first and second rotating balls, wherein the second drive voltage is used in rotating only the second rotating ball and has a potential lower than that of the first drive voltage.

6. An electronic paper display apparatus, comprising:
   plural pairs of rotating balls each pair having different diameters;
   a partition wall member having a plurality of cavities each in which a respective one of rotating balls is positioned;
   a lower structure formed beneath the partition wall member;
   an upper structure formed above the partition wall member, and configured to define the plurality of cavities together with the partition wall member and the lower structure;
   an electrode structure formed on the partition wall member and configured to provide drive voltages to each of the plurality of rotating balls; and
   a plurality of distance adjusting members disposed on at least one of the lower structure and the upper structure so that the ratio of the distance between the lower and upper structures to the diameter of the rotating ball falls within a range of 1.1 to 1.7.

7. The apparatus according to claim 6, wherein the plurality of distance adjusting members is selectively disposed in one of the plurality of cavities, in which a relatively small size of rotating ball is positioned.

8. The apparatus according to claim 6, wherein the plurality of distance adjusting members is an optically-transparent resist pattern disposed adjacent the lower structure compared to the rotating ball.

9. The apparatus according to claim 6, wherein the plurality of distance adjusting members is disposed adjacent the lower structure compared to the rotating ball,
   wherein the distances between the rotating balls and the upper structure are equal to each other.

10. The apparatus according to claim 6, wherein each of the plurality of distance adjusting members includes:
    a first distance adjusting member disposed adjacent the lower structure compared to the rotating balls; and
    a second distance adjusting member disposed adjacent the upper structure compared to the rotating balls.

11. The apparatus according to claim 6, wherein the plurality of distance adjusting members is a dry film resist (DFR).

12. The apparatus according to claim 6, wherein the first rotating ball is driven by a drive voltage higher than that of the second rotating ball,
    wherein the electrode structure selectively provides a first drive voltage or a second drive voltage to the first or second rotating balls, wherein the first drive voltage is used in rotating both the first and second rotating balls, wherein the second drive voltage is used in rotating only the second rotating ball and has a potential lower than that of the first drive voltage.

13. A method of manufacturing an electronic paper display apparatus, comprising:
   preparing plural pairs of rotating balls each pair having a first rotating ball and a second rotating ball of a size smaller than that of the first rotating ball;
   forming a partition wall member having a plurality of cavities each in which a respective one of the rotating balls is positioned, on a lower electrode, and further forming a lower structure;
   forming an upper structure with an upper electrode which provides a drive voltage to each of the plurality of rotating balls;
   forming a plurality of distance adjusting members on at least one of the lower structure and the upper structure; and
   disposing the distance adjusting member inside the plurality of cavities and further coupling the lower structure and the upper structure so that the ratio of the distance between the lower and upper structures to the diameter of the rotating balls falls within a range of 1.1 to 1.7.

14. The method according to claim 13, wherein the forming the distance adjusting member includes forming an insulating film on the upper structure.

15. The method according to claim 13, wherein the forming the distance adjusting member includes:
   forming a dry film resist on at least one of the lower and upper electrodes; and
   removing the dry film resist film formed on the remaining region excluding one facing the second rotating ball in the upper electrode.

16. The method according to claim 13, wherein the forming the dry film resist includes laminating an optically-transparent dry film resist on the upper structure.

17. The method according to claim 13, wherein the coupling includes:
   forming a spacer on the lower structure and the upper structure; and
   closely attaching the lower structure and the upper structure using the spacer as a stop film.

* * * * *

UNITED STATES PATENT AND TRADEMARK OFFICE
CERTIFICATE OF CORRECTION

| | | |
|---|---|---|
| PATENT NO. | : 8,619,353 B2 | Page 1 of 1 |
| APPLICATION NO. | : 13/373293 | |
| DATED | : December 31, 2013 | |
| INVENTOR(S) | : Lee et al. | |

It is certified that error appears in the above-identified patent and that said Letters Patent is hereby corrected as shown below:

In the Specification

Column 1, Line 9, before "filed" delete "entitled".

Signed and Sealed this
Twenty-second Day of July, 2014

Michelle K. Lee
*Deputy Director of the United States Patent and Trademark Office*